United States Patent
Hildebrand et al.

(10) Patent No.: US 6,913,416 B2
(45) Date of Patent: Jul. 5, 2005

(54) BITUMEN OR ASPHALT FOR THE PRODUCTION OF ROAD SURFACES, ROAD SURFACES, AND METHOD FOR THE PREPARATION OF BITUMEN OR ASPHALT

(75) Inventors: Günter Hildebrand, Rehmsdorf (DE); Ferdinand Richter, Hamburg (DE); Michael Matthäi, Henstedt-Ulzburg (DE); Bruno Iversen, Hamburg (DE); Klaus-Werner Damm, Buchholz (DE)

(73) Assignee: Schuman Sasol GmbH, Hamburg (DE)

( * ) Notice: Subject to any disclaimer, the term of this patent is extended or adjusted under 35 U.S.C. 154(b) by 0 days.

(21) Appl. No.: 10/393,630

(22) Filed: Mar. 20, 2003

(65) Prior Publication Data

US 2003/0231928 A1 Dec. 18, 2003

Related U.S. Application Data

(63) Continuation of application No. 09/486,758, filed on May 16, 2000, now Pat. No. 6,588,974.

(30) Foreign Application Priority Data

Aug. 29, 1997 (DE) .......................... 197 37 755
Dec. 23, 1997 (DE) .......................... 197 57 553
Jun. 12, 1998 (DE) .......................... 198 26 144
Aug. 26, 1998 (DE) .......................... 198 38 770

(51) Int. Cl.$^7$ .............................................. E01C 3/00
(52) U.S. Cl. ............................... 404/31; 404/75
(58) Field of Search ............................. 404/27, 31, 32, 404/75, 72, 79, 80–82

(56) References Cited

U.S. PATENT DOCUMENTS 3,853,682 A * 12/1974 Hurst ......................... 428/40.3
4,052,290 A * 10/1977 Cushman et al. .............. 208/6

FOREIGN PATENT DOCUMENTS

| DE | 400058 | 8/1924 |
| DE | 2250694 | 4/1974 |
| DE | 208164 | 3/1984 |
| FR | 772201 | 10/1934 |
| FR | 2721936 | 8/1996 |
| GB | 2037299 | 7/1980 |

OTHER PUBLICATIONS

"Pavement Analysis and Design" of Yang H. Huang, University of Kentucky, Prentice Hall, Englewood Cliffs, NJ 07632, Dec. 10, 1992.

* cited by examiner

*Primary Examiner*—Thomas B. Will
*Assistant Examiner*—Alexandra K. Pechhold
(74) *Attorney, Agent, or Firm*—Martin A. Farber

(57) ABSTRACT

Bitumen or asphalt for producing a road topping, whereby the bitumen or asphalt contains a proportion of paraffin obtained by Fischer-Tropsch synthesis (FT paraffin). A road topping with the bitumen and a method for producing a corresponding road topping or roadway covering using the bitumen.

7 Claims, 4 Drawing Sheets

BITUMEN OR ASPHALT FOR THE PRODUCTION OF ROAD SURFACES, ROAD SURFACES, AND METHOD FOR THE PREPARATION OF BITUMEN OR ASPHALT

This application is a continuation application of our application U.S. Ser. No.: 09/486,758 filed May 16, 2000, now U.S. Pat. No. 6,588,974 the entire contents and disclosure of which are considered as being part of the disclosure of this continuation application and are hereby incorporated by reference herein in their entirety.

The invention relates to bitumen (asphalt) or asphalt (asphalt cement) for the production of road surfaces.

FIELD AND BACKGROUND OF THE INVENTION

Road surfaces are very widely produced in the form of asphalt or a mixture of bitumen with aggregates, such as sand, gravel, grit (round or crushed) or the like.

SUMMARY OF THE INVENTION

One aim in a road surface is to achieve high wear resistance. Furthermore, the deformation tendency should be low in order that unevenness, such as wheel tracks or the like, if possible does not occur, is slight or only occurs after a long period of use.

The invention is concerned with the technical problem of providing an improved bitumen or asphalt, in particular for the production of road surfaces.

This technical problem is substantially resolved wherein the bitumen or asphalt contains a proportion of paraffin obtained by a Fischer-Tropsch synthesis (FT paraffin). FT paraffins principally consist only of normal paraffins. More than 90% are usually n-alkanes. The remainder consists of iso-alkanes. The chain length is from C30 to about C100, with a gradation (solidification point, SP) from about 68 to about 105° C. The proportion of FT paraffin is preferably 0.5% or more, based on a bitumen content of the asphalt or based on bitumen as such. In practice, these percentages are based on the weight. However, they can also be percent by volume. Surprisingly it has been found that a road surface produced using bitumen or asphalt modified in this way is significantly more durable. The formation of wheel tracks under the usual loads occurring in road traffic due to motor vehicles is significantly reduced compared with conventional road surfaces based on bitumen or asphalt. The strength of a road surface is dependent on various interdependent factors, in particular, inter alia, on the degree of compaction. Surprisingly, it has been found here that the addition of FT paraffin facilitates significantly greater compaction. Although the FT paraffins ultimately result in a harder form of the road surface, in the liquid state they simultaneously reduce the viscosity of the "binding material", i.e. the bitumen. They act as it were as "fluidizers". The grit used, round or crushed, is also of importance with respect to the strength of the road surface. In the case of crushed grit, high strengths can be achieved, attributable to the intermeshing of the individual grit particles. However, better compaction can be achieved in the case of uncrushed, round grit or gravel. In this connection too, the addition of FT paraffins has advantageous effects. The adherence of bitumen to the stone, such as precisely this grit or gravel, is improved. A particularly significant improvement can be achieved if—at least partially—oxidized FT paraffins are employed. Although this causes the solidification point to drop by about 5° compared with non-oxidized FT paraffins, the abovementioned adherence is significantly improved, enabling the use of round gravel or grit, at least to a certain proportion, without reductions in strength having to be accepted. The advantageous effect of oxidized FT paraffins is attributed to the functional groups (polarity) which they thereby provide.

In practice, the proportion of FT paraffins is in the range from 0.5 to 10 percent by weight, preferably in the range from 2.5 to 7.5 percent by weight, and further preferably about 4 to 5 percent by weight, based on the bitumen. Regarding the FT paraffins, a preferred range of use is those having a solidification point from 90 to about 105° C.

Whereas standard asphalt, in the form of rolling asphalt, contains about 3 to 8% of bitumen, so-called mastic asphalt, which contains about 6.5 to 8.5% of bitumen, is also prepared. Bitumen grades of B45 or higher are usually employed here. In order to prevent settling of the mineral constituents during transport of mastic asphalt, it is necessary to effect constant stirring until final processing. In order to keep the viscosity low for this stirring, the mastic asphalt is kept at a relatively high temperature, namely at 200 to 250° C. Surprisingly, the addition of FT paraffins, as explained above, in an approximately equal ratio to the mastic asphalt (or the bitumen of the mastic asphalt) results in it being possible significantly to lower the temperature which is necessary to keep the mixture stirrable. Whereas temperatures of at least 220 to 250° C. were hitherto necessary, a reduction of 30° C. is possible on addition of FT paraffins. This lowering in the temperatures is at the same time accompanied by the considerable advantage that release of harmful substances is reduced.

In asphalt, such as mastic asphalt or even rolling asphalt, it has also been found that a significantly longer time is available for working or processing the asphalt. Surprisingly, it has been found that the processing of this asphalt was also possible at lower temperatures than hitherto. Besides the reduction in viscosity described above, this effect is also attributed to a latent heat storage effect of the paraffin. On phase conversion of the paraffin, heat liberation takes place without a reduction in temperature.

Furthermore, the invention also relates to a road surface consisting of a lower layer of sand/gravel (frost protection layer), a bituminous sub-base on top of the sand/gravel layer, an asphalt binder layer and an asphalt/concrete layer, more generally known as an asphalt pavement. With respect to a road surface of this type, the invention is concerned with the technical problem of achieving greater durability, in particular with respect to deformation resistance.

This technical problem is firstly and substantially resolved in respect of the road surface in that the bitumen of the asphalt pavement layer and/or of the bituminous sub-base contains a proportion of FT paraffins. The proportion of FT paraffins is preferably in the range from 0.5 to 10% by weight, further preferably 2.5 to 7.5% by weight. However, volume percentages can also be used here.

Although not always regarded as necessary, it is also within the scope of the invention, as stated, to modify the upper pavement layer, i.e. the asphalt pavement, by addition of FT paraffins. In fact, it has even been found that addition of from 1 to 3% of FT paraffins to the asphalt pavement allows greater strength to be achieved, in particular owing to the greater potential for compaction. More recent knowledge even indicates that the addition of FT paraffins to the asphalt pavement layer is the most important factor with respect to the individual layers of a road surface.

The FT paraffins in this connection are FT paraffins having an SP from 68 to 105° C., preferably in chain lengths from C30 to C100 or even C105. The above comments, in particular also with respect to oxidized FT paraffins, apply in the same way here.

The invention is also concerned with a method for the production of a road surface with regard to the technical problem of achieving greater durability.

In this respect, the invention proposes admixing an asphalt mixture for the production of a bituminous sub-base and/or an asphalt binder layer and/or an asphalt pavement in road-building with bitumen containing a proportion from 0.5 to 10%, preferably 2.5 to 7.5%, further preferably 4.5%–5%, suitably in percent by weight, of FT paraffins. The FT paraffins are preferably added to the liquid bitumen or to the asphalt in solid or liquid form. In respect of a solid form, the FT paraffins here can be, for example, in the form of granules, powder, flakes or pellets. In the flake form, a flake-like substrate is involved. The admixing with the bitumen or asphalt is further preferably carried out at a bitumen temperature from about 160 to 170° C. The aggregate, such as stone, gravel or grit, is then added to the bitumen modified in this way.

Overall, it has been found that a bitumen of this type has a higher softening point, with lower penetration. Indeed, the penetration is slightly lower than would have been expected. The softening point rises more quickly than the penetration drops. There was no evidence of separation. The bitumen modified in this way has an advantageously long shelf-life. In addition, the adhesion behavior is improved for approximately the same breaking point compared with conventional bitumen. A corresponding improvement also arises, as also mentioned, in the asphalt mixture produced using this bitumen. Surprisingly, the low-temperature behavior is not impaired. Instead, it is determined by the base bitumen used.

The invention also relates to a method for the production of a road surface containing proportions of used asphalt from a scraped-off road surface and proportions of fresh asphalt, in which the used asphalt is firstly warmed to a temperature which is lower than the temperature of the fresh asphalt, and the proportions of used asphalt and fresh asphalt are then mixed. In a method of this type, the invention proposes the addition of FT paraffin to the fresh asphalt, or if desired to the used asphalt. Surprisingly, this allows better break-up of the used asphalt to be achieved. The used asphalt is only warmed sufficiently that liquefaction does not take place. Instead, the liquefaction and mixing with the fresh asphalt only occur due to the addition of the fresh asphalt and the significantly higher temperature of the fresh asphalt. The fact that FT paraffin is added to the fresh asphalt causes the fresh asphalt to liquefy to a greater extent, resulting in more intimate mixing and thus faster temperature-wise breaking-up of the used asphalt. In this connection, the FT paraffins are preferably added in a proportion from 0.1 to 0.5%, in an example carried out in a proportion of about 0.25%, in each case suitably in percent by weight based on the amount of fresh asphalt employed.

EXAMPLES

Example 1

Road-building bitumen B 100 was prepared with 2.5%, 5% and 7.5 by volume of FT paraffins. The FT paraffins were stirred into the bitumen using a paddle stirrer at 160° C.

The following values were obtained here:

|  |  | Units | B100 | B100 + 2.5% FT paraffin | B100 + 5.0% FT paraffin | B100 + 7.5% FT paraffin |
|---|---|---|---|---|---|---|
| Softening point |  | ° C. Bath liquid | 44.5 Water | 75.5 Water | 94.5 Glycerol | 101.0 Glycerol |
| Penetration at 25° C. |  | mm/10 | 89 | 57 | 44 | 41 |
| Fraass breaking point |  | ° C. | −14.5 | −13.0 | −12.0 | −10.0 |
| Thermal stability |  | ° C. | 0.5 | 1.5 | 1.5 | 1.0 |
| Adhesive behavior (Austrian Standard B3682) +40° C. storage in water, covering of the surface | | | | | | |
| Dolomitic limestone |  |  |  |  |  |  |
| 24 hours |  | % | 100 | 100 | 100 | 100 |
| 48 hours |  | % | 100 | 100 | 100 | 100 |
| Dolomite | 24 hours | % | 95 | 100 | 100 | 100 |
|  | 48 hours | % | 95 | 100 | 100 | 100 |
| Granulite | 24 hours | % | 100 | 100 | 100 | 100 |
|  | 48 hours | % | 95 | 100 | 100 | 100 |
| Granite | 24 hours | % | 90 | 100 | 100 | 100 |
|  | 48 hours | % | 85 | 100 | 100 | 100 |
| Change in weight after RTFOT (ASTM D2872-88) |  | % | <0.1 | <0.1 | <0.1 | <0.1 |
| Ring-and-ball softening point after RTFOT |  | ° C. Bath liquid | 43.5 Water | 73.0 Water | 97.5 Glycerol | 102.0 Glycerol |
| Reduction in R&BSP |  | % | 2.2 | 3.3 | — | — |

-continued

|  | Units | B100 | B100 + 2.5% FT paraffin | B100 + 5.0% FT paraffin | B100 + 7.5% FT paraffin |
|---|---|---|---|---|---|
| Increase in R&BSP | % | — | — | 3.2 | 1.0 |
| Penetration at 25° C. after RTFOT | mm/10 | 62 | 37 | 28 | 26 |
| Reduction in penetration | % | 30.3 | 35.1 | 36.4 | 36.6 |

The following explanations apply to the table:

The softening point was determined using a ring and ball in accordance with Austrian Standard C9212. The penetration was determined in accordance with Austrian Standard C9214. The Fraass breaking point was determined in accordance with Austrian Standard C9213. The thermal stability (tube test) was tested in accordance with TL-Pmb, Part 1 (1991) at +180° C. and 72 hours. The adhesive behavior was tested in accordance with Austrian Standard B3682 on the following stones:

EBK 8/11 dolomitic limestone (Bad Deutsch Altenburg); EBK 8/11 dolomite (Gaaden); EBK 8/11 granulite (Meiding); EBK 8/11 granite (Niederschrems).

The "rolling thin film oven test" heating test was carried out in accordance with ASTM D 2872-88 at 163° C., and the weight change, the change in ring-and-ball softening point and the penetration were determined at 25° C.

The results show that the addition of FT paraffin results in an increase in the softening point and a reduction in the penetration. The adhesive behavior is improved by addition of FT paraffin in respect of aggregate of various particle size (0–32), such as granite, granulite or dolomitic limestone.

The added FT paraffin was an FT paraffin having the usual chain-length distribution with a maximum of C40 to about C60 obtained from the Fischer-Tropsch synthesis.

Example 2

A road surface consisting of a pavement layer and an asphalt binder layer was produced. The asphalt layer contained 2–3%—based on the bitumen—of FT paraffins of usual chain length as obtained from the Fischer-Tropsch synthesis.

A significant extension of the possible compaction time of the bituminous sub-base from the 0.5 hour usual hitherto to more than 2 hours was evident owing to improved flow behavior due to the addition of FT paraffins. Processing was still possible at outside temperatures of below 3° C. The degree of compaction in the bituminous sub-base and in the pavement layer also increased. For example, degrees of compaction of 97% were usual hitherto. Here, a degree of compaction of more than 100% was achieved. A significant increase in durability with a considerable reduction in the tendency to form wheel tracks was obtained.

Example 3

Mastic asphalt was prepared with a bitumen content of 7.5%. FT paraffins were added to the bitumen in a proportion of 5%, based on the weight of the bitumen. A reduction in the hitherto usual processing temperature (stirring temperature) from 250 to 220° C. was obtained. In spite of the reduced processing temperature, the addition of FT paraffins resulted in an improvement in the flow behavior, which resulted in a longer processing life for the mastic asphalt. A significant reduction in the emission values on application of the mastic asphalt was observed owing to the temperature reduction. Overall, more square metres were achieved per time unit during processing since it was possible to process greater amounts of asphalt without having to fear a reduction below the minimum processing temperature necessary.

Example 4

The track formation on grit mastic asphalt 0/11 S, B 65, was measured. The designation "0/11" here represents a stone size of from 0 to 11 mm. The results shown in the following table were achieved. The FT paraffin content is based on the bitumen employed (% by weight).

| FT paraffin content (%) | Track depth [mm], 40° C. | 20,000 traverses 50° C. |
|---|---|---|
| 0 | 3.0 | 5.7 |
| 2 | 1.5 | 2.7 |
| 3 | 1.2 | 2.2 |

Example 5

Comparative experiments were carried out using bitumen B80 and 0% by weight, 1.5% by weight, 3.0% by weight and 4.5% by weight, based on the original binder B80. The results achieved here are shown in the table below.

| Binder | Proportion of FT paraffin in percent by wt. | | | |
|---|---|---|---|---|
|  | B80 + 0 | B80 + 1.5 | B80 + 3.0 | B80 + 4.5 |
| R&B softening point ° C. | 48 | 52 | 76 | 96 |
| Penetration 1/10 mm | 71 | 48 | 37 | 42 |
| Fraass breaking point ° C. | −7.5 | −7.5 | −6.5 | −7.5 |
| Ash Content % | 0.18 | 0.16 | 0.15 | 0.19 |
| Ductility, 25° C. cm | >100 | >100 | 95 | >100 |
| Density, 25° C. g/cm³ | 1.0228 | 1.0233 | 1.214 | 1.216 |
| After heating in a rotating flask, 165° C. | | | | |
| Weight change % | −0.05 | 0.05 | 0.1 | 0.2 |
| Rise in R&B softening point ° C. | 3.5 | 9.5 | 5.5 | 0.5 |
| Drop in Penetration % | −25.4 | −24.6 | −16.2 | −21.4 |
| Ductility, 25° C. cm | >100 | >100 | 90 | >100 |
| Viscosity | | | | |
| 110° C. | 2300 | 2119 | 1713 | 1593 |
| 130° C. | 750 | 600 | 50.4 | 480 |
| 180° C. | 95 | 72 | 74 | 64 |
| EVT 100° C. | 178° C. | 170° C. | 166° C. | 165° C. |

Example 6

Further experiments were carried out using B45, B65 and B80, in each case with 4 or 6% of FT paraffin, again in % by weight, based on the starting binder. In addition, corresponding values for a polymer-modified bitumen (PmB45A) and a bitumen B45 containing 30% by weight of Trinidad Epuré were determined for comparison. The results are shown in the table below.

Basically, the following general results were obtained here.

FT paraffin can be stirred homogeneously into bitumen at temperatures of 150° C. The transition from the solid state to the liquid state, defined by the R&B softening point, is raised very considerably by the added FT paraffin. If the softening points of the starting bitumen are in the range from 50 to 60° C., they increase to 85 to 95° C. due to the addition of 4% by weight of FT paraffin. By contrast, the penetration only drops slightly. An increase in viscosity in the region of 2 binder grades (B80 to B45) occurs. The behavior at low temperatures changes only very slightly on determination of the Fraass breaking point and shifts by a maximum of 1 binder grade. This thus gives rise to a considerable increase in the plasticity range. It is furthermore evident that the changes are more pronounced, the softer the starting binder selected.

The frost-protection layer 4 consists of a mixture of sand and gravel. It has a depth h1 of about 40 cm. The bituminous sub-base 3 above the frost-protection layer has a depth h2 of from 6 to 20 cm, and the asphalt pavement 2 has a depth h3 of from about 2 to 4 cm.

The bituminous sub-base 3 is produced using a bitumen containing about 5 percent by weight of FT paraffins. The FT paraffin has a melting point of about 100° C. and has been obtained by the Fischer-Tropsch synthesis.

The bituminous sub-base 3 in the stated composition has significantly greater durability. Since the durability of the bituminous sub-base is responsible for the deformation behavior of the road surface, in particular wheel track formation, a significantly longer service-life overall is achieved by this.

In FIG. 2, there is shown in diagrammatic form, a tank 5 for the preparation of a mixture for a bituminous sub-base. The tank 5 can be heated by way of a heating device 6.

Aggregates, such as gravel and sand 10, or other stones of various particle size, bitumen 11 and FT paraffins 12 are introduced into the tank 5 by way of chutes 7, 8 and 9. These constituents are stirred with one another, as likewise show

|  | R&B softening point [° C.] | Needle penetration [0.1 mm] | Fraass breaking point [° C.] | ΔT [° K.] | Plasticity range Increase comp. w. bit. or FT p. [%] | comp. w. PmB45A [%] |
|---|---|---|---|---|---|---|
| B45 | 58.5 | 33 | −12 | 70.5 | — | — |
| B45 + 4% FT p. | 87.5 | 25 | −10 | 97.5 | 38 | 37 |
| B45 + 6% FT p. | 93.5 | 21 | −6 | 99.5 | 41 | 40 |
| B65 | 51.0 | 48 | −8 | 59 | — | — |
| B65 + 4% FT p. | 91.0 | 25 | −9 | 100 | 69 | 41 |
| B65 + 6% FT p. | 93.5 | 25 | −7 | 110.5 | 70 | 42 |
| B80 | 45.5 | 83 | −11 | 56.5 | — | — |
| B80 + 4% FT p. | 83.5 | 50 | −11 | 94.5 | 67 | 33 |
| B80 + 6% FT p. | 92.0 | 45 | −8 | 100 | 77 | 41 |
| PmB45A | 58.0 | 38 | −13 | 71 | — | — |
| B45 + Trinidad | 66.0 | 21 | −8 | 74 | — | — |

BRIEF DESCRIPTION OF THE DRAWINGS

The invention is also explained below in particular with respect to the production of a road surface with reference to the attached drawing, which, however, only shows illustrative embodiments. In the drawing.

DETAILED DESCRIPTION OF THE PREFERRED EMBODIMENTS

Figure 1:
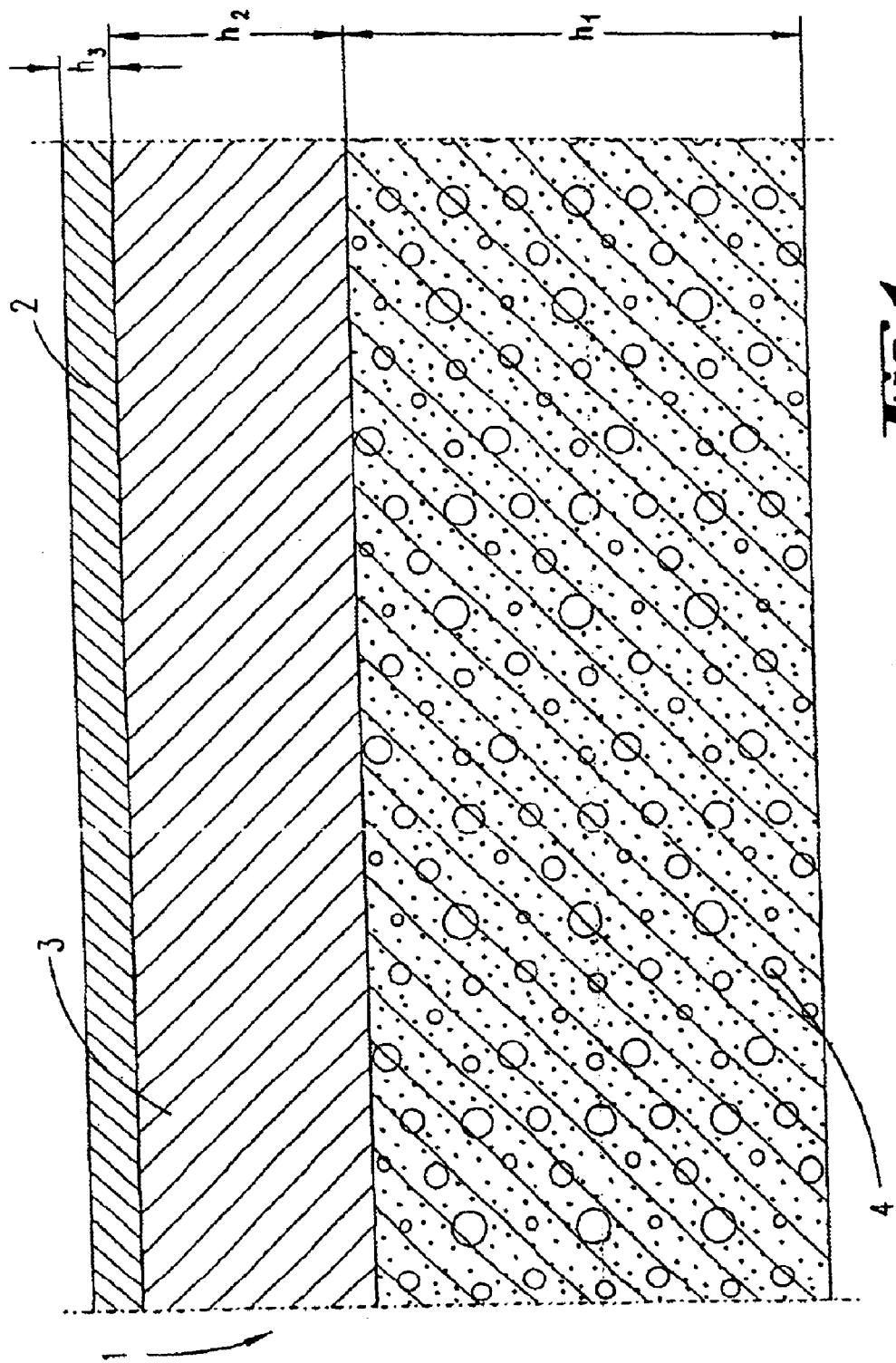
FIG. 1 shows in diagrammatic manner, a sectional view through a road surface.
Figure 2:
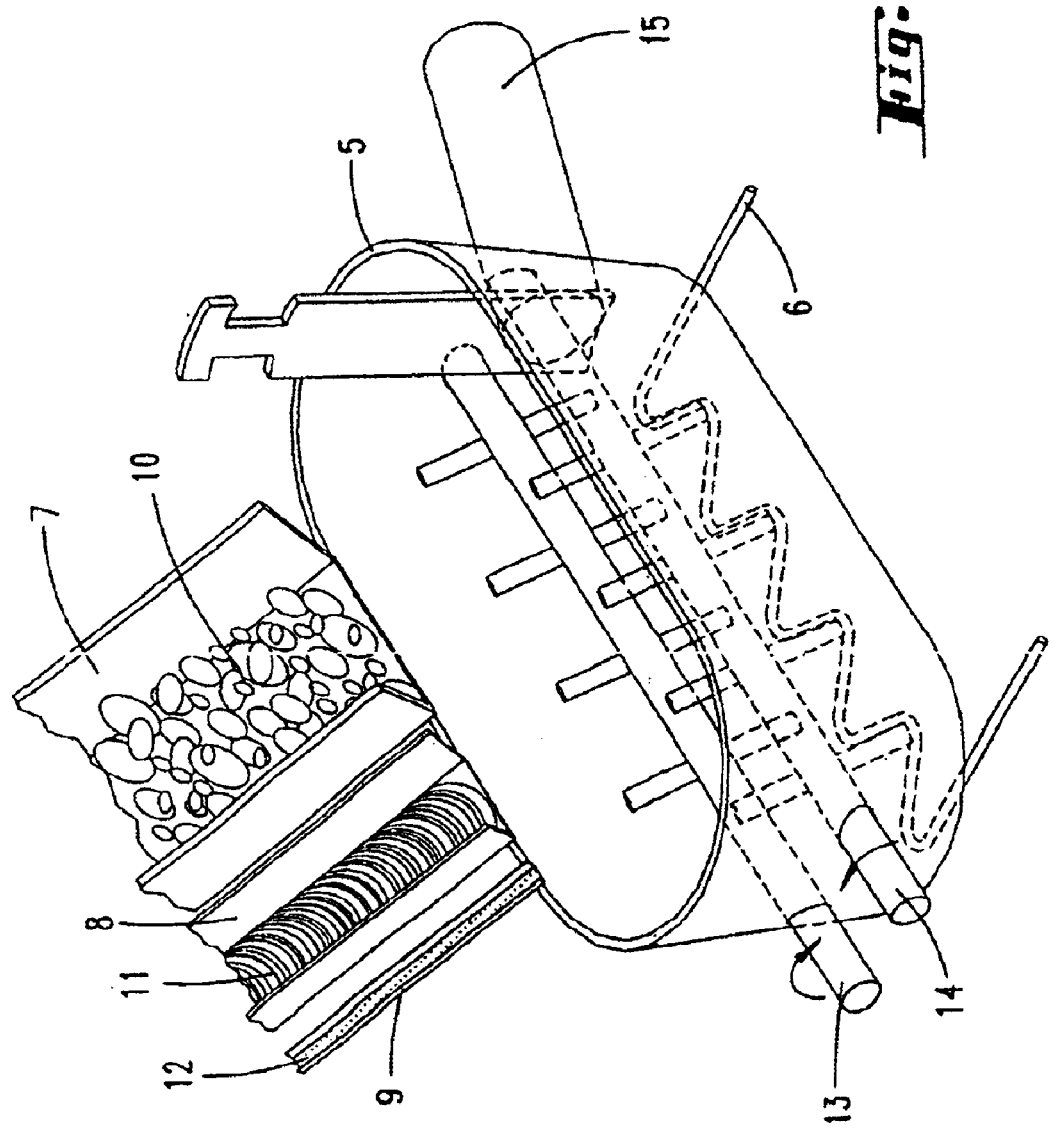
FIG. 2 shows a diagrammatic view of the preparation of asphalt.

With reference to FIG. 1, the following may be explained.

The road surface 1 consists of an upper asphalt concrete layer, also referred to as asphalt pavement 2, a middle bituminous sub-base 3 and a lower frost-protection layer 4.

diagrammatically, by means of a stirrer consisting of two contra-rotating screws 13, 14. The composition prepared in this way can be discharged from the tank by way of an outflow 15. The stirring is carried out at a temperature of about 160° C.

The mixture consists of about 95% of stone and 5% of bitumen. To this is added 5% of FT paraffin, based on the 5 percent bitumen content.

The term "FT paraffin" is occasionally also replaced by the term "hydrogenated wax" or "hydrogenated paraffin". For the purposes of the present application, reference is made to paraffin obtained by the Fischer-Tropsch synthesis, which is occasionally also referred to as macrocrystalline paraffin. This preferably consists of long-chain hydrocarbons having chain lengths in the range from C30 to C80, C90 or C100.

Figure 3:
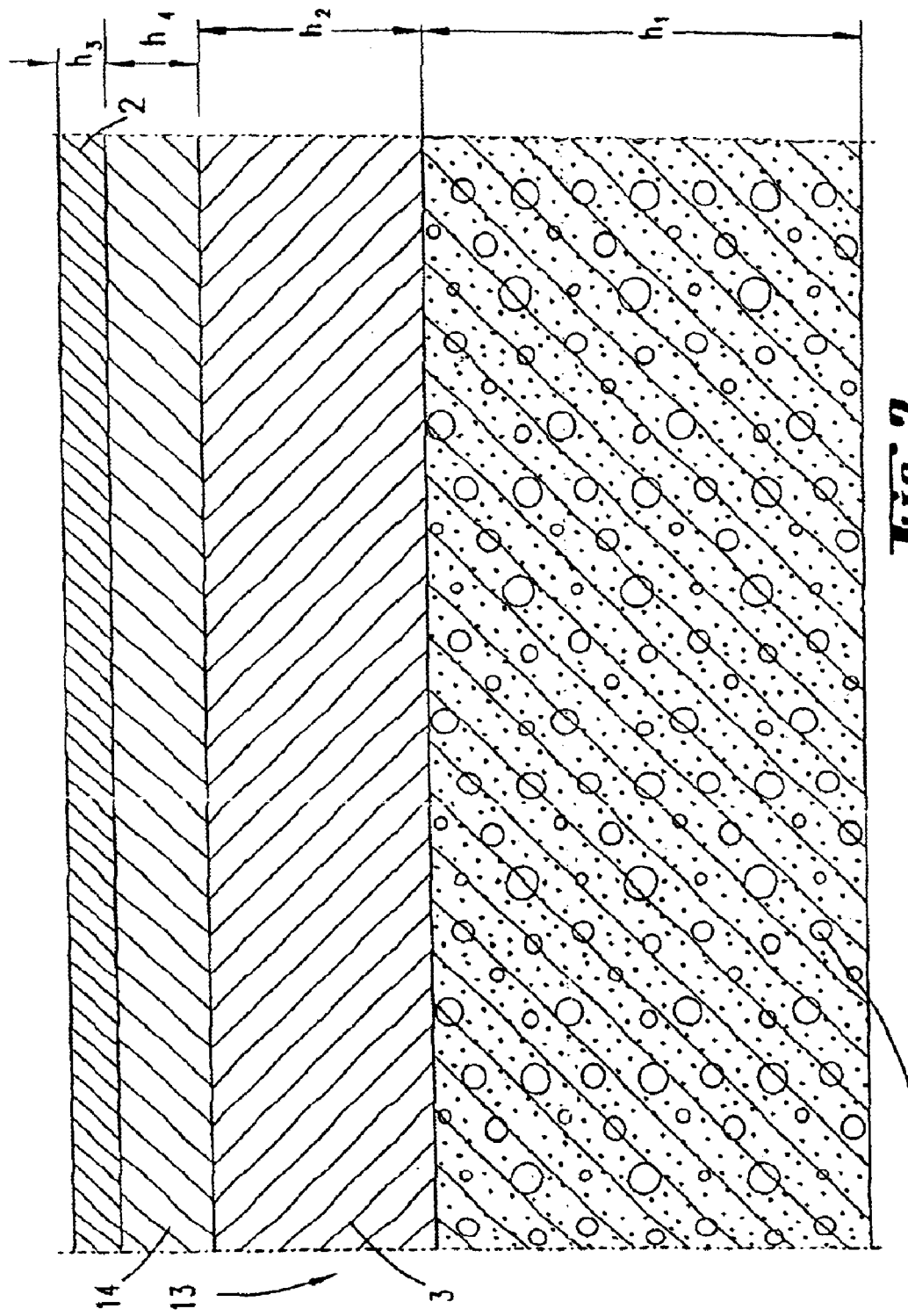
FIG. 3 shows in diagrammatic manner, a sectional view through a further road surface.

Referring now to FIG. 3, a road surface 13 is shown which consists of an asphalt pavement 2, an asphalt binder layer 14 beneath the pavement, a bituminous sub-base 3 and a lower frost-protection layer 4.

Whereas the asphalt pavement 2, the bituminous sub-base 3 and the frost-protection layer 4 have a structure as also explained above under FIG. 1, the asphalt binder layer 14 has a depth h4 of from 4 to 8 cm.

Figure 4:
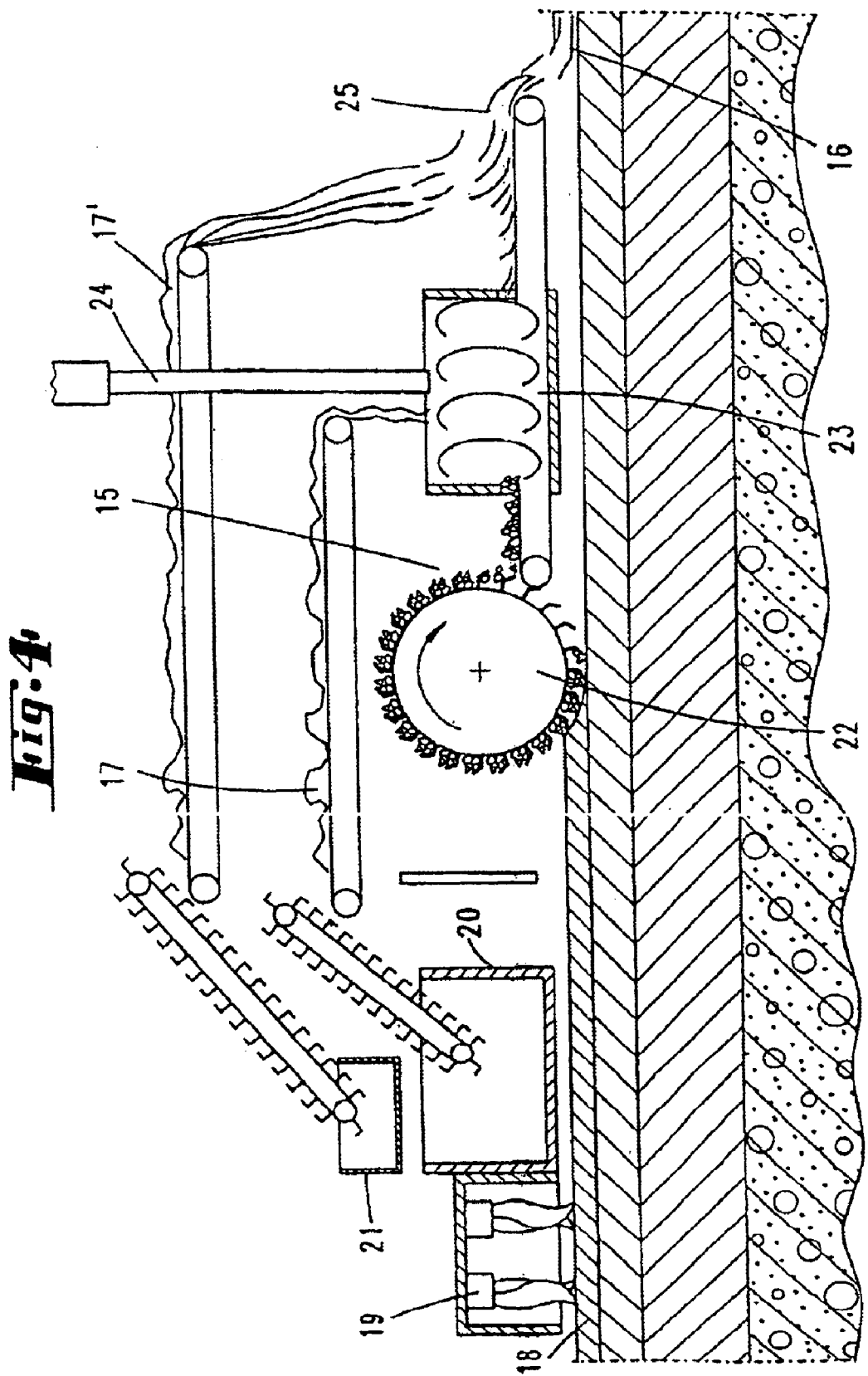
FIG. 4 shows a diagrammatic view of the production of a road surface using a mixture of used asphalt and fresh asphalt.

Referring now to FIG. 4, the scraping-off of a used road layer with recovery of used asphalt 15 and the formation of a new road surface 16 containing a fraction of fresh asphalt 17 and used asphalt 15 is shown diagrammatically.

Firstly, the old road surface 18 is heated, in the illustrative embodiment by flames from burners 19. Further tanks 20, 21 are provided by means of which fresh asphalt is prepared. Fresh asphalt has usual temperatures in the range from 200 to 250°. The heating of the old road surface 18 can also be carried out using exhaust heat from the heating of the fresh asphalt.

Furthermore, the old road surface 18 is scraped off using a milling cutter 22, producing lumps of used asphalt 15. The used asphalt 15 is fed to a mixing unit 23, into which fresh asphalt 17 is also introduced. In addition, the asphalt 17 can also be added after the mixing unit 23.

Furthermore, FT paraffin is added, either already to the fresh asphalt in a tank 20 or by way of its own addition device 24, for addition in the mixing unit 23. The asphalt 25 finally obtained is applied to the base to form the new road pavement 16.

What is claimed is:

1. Asphalt in the form of a mixture of bitumen with aggregates including at least one of sand, gravel and grit, for production of road surfaces, comprising a content of paraffin obtained by a Fischer-Tropsch-synthesis, the paraffin being homogeniously distributed within the bitumen, and being present in an amount of 0.5 to 5 percent of the bitumen.

2. Asphalt according to claim 1 wherein a proportion of paraffin obtained by a Fischer-Tropsch synthesis is 0.5% to 10%.

3. Asphalt according to claim 1, wherein the paraffin obtained by a Fischer-Tropsch synthesis has a melting point from about 68 to 105° C.

4. Asphalt according to claim 1, wherein the paraffin obtained by a Fischer-Tropsch synthesis at least partly comprises oxidized paraffin obtained by a Fischer-Tropsch synthesis.

5. Asphalt for production of a road surface, according to claim 1, wherein the asphalt is disposed in a layer having sufficient rigidity to support vehicular traffic.

6. Use of mastic asphalt in the form of a mixture of bitumen with aggregates including at least one of sand, gravel and grit, in a layer, wherein paraffin obtained by a Fischer-Tropsch synthesis has been added to the mastic asphalt, for screeds, bridge surfaces and mastics and asphalt layers of all types, the paraffin being homogeniously distributed within the bitumen, and being present in an amount of 0.5 to 5 percent of the bitumen.

7. Use of mastic asphalt in a layer, according to claim 6 wherein the layer has sufficient rigidity to support vehicular traffic.

* * * * *